United States Patent [19]

Farquharson et al.

[11] Patent Number: 5,385,586
[45] Date of Patent: Jan. 31, 1995

[54] LIQUOR OXALATE STABILIZERS

[75] Inventors: Graeme J. Farquharson, Sydney, Australia; John D. Kildea, Mandurah, Wash.; Anthony E. Gross, St. Charles, Ill.; Stephen C. Grocott, Gardens Winthrop, Wash.

[73] Assignee: Nalco Chemical Company, Naperville, Ill.

[21] Appl. No.: 214,928

[22] Filed: Mar. 17, 1994

Related U.S. Application Data

[63] Continuation-in-part of Ser. No. 36,293, Mar. 24, 1993, abandoned.

[51] Int. Cl.$^6$ .................................................. C01F 7/34
[52] U.S. Cl. ........................... 23/305 A; 23/300; 423/121; 423/130; 423/131
[58] Field of Search ............... 423/119, 121, 130, 131; 23/300, 305 A

[56] References Cited

U.S. PATENT DOCUMENTS

| | | | |
|---|---|---|---|
| 3,023,162 | 2/1962 | Fordyee | 423/119 |
| 4,146,573 | 3/1979 | Kane | 423/119 |
| 4,275,042 | 6/1981 | Lever | 423/130 |
| 4,280,987 | 6/1981 | Yamada et al. | 423/119 |
| 4,578,255 | 3/1986 | Roe et al. | 423/130 |
| 4,597,592 | 7/1986 | Fabre et al. | 423/130 |
| 4,597,952 | 7/1986 | Faber et al. | 423/121 |
| 4,608,237 | 8/1986 | Roe et al. | 423/121 |
| 4,789,985 | 12/1988 | Field et al. | 423/122 |
| 4,836,990 | 6/1989 | Swinkels | 423/120 |
| 4,999,170 | 5/1991 | Brown | 423/121 |
| 5,284,634 | 2/1994 | Strominger et al. | 423/130 |
| 5,312,603 | 5/1994 | Hachgenei et al. | 423/121 |

FOREIGN PATENT DOCUMENTS

| | | | |
|---|---|---|---|
| 89-35943 | 1/1989 | Australia. | |
| 480825 | 2/1952 | Canada | 423/121 |
| 2160853 | 1/1986 | United Kingdom. | |

OTHER PUBLICATIONS

Lever et al, Some Aspects of the Chemistry of Bauxite Organic Matter on the Bayer Process: The Sodium-Oxalate-Humate Interaction, Trauaux vol. 13 (1983) #18.

*Primary Examiner*—Gary P. Straub
*Attorney, Agent, or Firm*—Robert A. Miller; James J. Drake

[57] ABSTRACT

A method for inhibiting the precipitation of sodium oxalate crystals in a Bayer process liquor. The method comprises the step of adding to the Bayer process liquor, after red mud separation and immediately prior to crystallization of alumina trihydrate, or during crystallization of alumina trihydrate, or during classification of alumina trihydrate, an effective amount of a cationic, surface active, alkylammonium salt compound.

4 Claims, No Drawings

LIQUOR OXALATE STABILIZERS

This application is a continuation-in-part of co-pending Ser. No. 08,036,293, filed Mar. 24, 1993, now abandoned.

BACKGROUND OF THE INVENTION

In the Bayer process for Bauxite ore beneficiation, crystallization and precipitation of solubilized alumina trihydrate values from caustic liquors, referred to herein as Bayer process liquor, is a critical step towards the recovery of aluminum values. Bayer process operators optimize their precipitation methods so as to produce the greatest possible yield from the Bayer process liquors. Production is often limited by processing conditions under which the crystallization and precipitation is conducted. These processing conditions vary from one plant to the next and include temperature profiles, seed charge, seed crystal surface area, liquor loading, liquor purity, and the like.

To obtain the maximum recovery of aluminum values from Bayer process liquor, a plant will typically attempt to maximize the liquor caustic level and minimize the final precipitation temperature. However, it is well known that sodium oxalate can co-precipitate with alumina trihydrate from Bayer process liquor, and that the solubility of sodium oxalate in Bayer process liquor is generally decreased by increasing caustic levels and decreasing precipitation temperatures. Uncontrolled co-precipitation of oxalate can cause a number of problems for a Bayer plant, which place restrictions on plant operating parameters and therefore on aluminum values recovery.

Well known adverse effects of co-precipitation of sodium oxalate include increasing product fines and soda levels, and interference with the efficient size classification of alumina trihydrate. High quality alumina trihydrate usually has a crystal coarseness specification of 90-95% of the crystals being at least 44 microns in diameter. It is known in the art that co-precipitating sodium oxalate can cause the alumina trihydrate crystals to precipitate as a very fine material which is below the usual quality specification of 90-95% of the crystals having 44 microns or greater in diameter.

Alumina trihydrate is precipitated from Bayer process liquor, which in essence is a concentrated sodium hydroxide solution. Typical soda levels in alumina levels are only 0.2-0.6% by weight as $Na_2O$. Nonetheless, it is desirable to produce alumina with soda levels at the lower end of this typical range. Modern smelters generally calculate their break-even point for soda in alumina at 0.35% $Na_2O$. As smelter technology improves and as older smelters are replaced, the incentive will become greater for alumina producers to meet this low soda level. Furthermore, some markets (e.g. catalysts, catalyst supports, refractories, electroceramics) require even lower soda levels. It would be advantageous to provide a method and composition for reducing soda levels in alumina.

The present invention provides a method for stabilizing solubilized sodium oxalate in a Bayer process liquor. This stabilization effect allows the Bayer process operator to add more caustic (NaOH) and/or lower final precipitation temperatures to improve recovery of aluminum values without adversely affecting product sizing or soda.

SUMMARY OF THE INVENTION

One aspect of the invention provides a method for stabilizing sodium oxalate in Bayer process liquors. According to the invention, Bayer process liquor is treated with a sodium oxalate stabilizing composition comprising a surface active, cationic quaternary alkylammonium salt, such as methyl bis(2-hydroxyethyl) oleylammonium chloride. One surprising and unexpected result is that the present invention inhibits the precipitation of sodium oxalate in Bayer process liquor up to surprising levels. Another important and unexpected result obtained by the method of the present invention is that use of certain of the cationic quaternary alkylammonium salts additionally gives a coarser alumina trihydrate particle size distribution. A further, and very important, unexpected and surprising result obtained with the present invention is that use of certain of the cationic quaternary alkylammonium salts gives an alumina product of lower soda content (% $Na_2O$). All of the above listed unexpected and surprising results provide a significant cost savings in the production of quality alumina.

The present invention modifies the Bayer process by stabilizing the solubilized sodium oxalate so that the concentration of caustic can, surprisingly, be increased without increasing the level of sodium oxalate impurities in the recovered alumina trihydrate. The present invention additionally modifies the Bayer process by stabilizing the solubilized sodium oxalate so that precipitation temperatures can, surprisingly, be reduced without increasing the level of sodium oxalate impurities in the recovered alumina trihydrate. The present invention additionally modifies the Bayer process by stabilizing the solubilized sodium oxalate thereby improving alumina trihydrate classification efficiency.

The method comprises the step of adding to the Bayer process liquor, after red mud separation, immediately prior to crystallization of the alumina trihydrate or at any stage during crystallization of the alumina trihydrate or at any stage during classification of the alumina trihydrate, an effective amount of a composition consisting essentially of a surface active, cationic alkylammonium compound. The alkylammonium compound is branched or straight chain and includes at least five carbon atoms. According to the invention, the addition of the effective amount of the alkylammonium compound stabilizes the solubilized sodium oxalate in the Bayer process liquor, thereby inhibiting the precipitation of sodium oxalate crystals from the Bayer process liquor.

According to another aspect of the invention, the alkylammonium compound is methyl bis(2-hydroxyethyl) oleylammonium chloride. Preferably, the alkylammonium compound is added in an effective amount of from about 5 to about 1,000 ppm or, more preferably, in an effective amount of from about 5 to about 25 ppm or, even more preferably, in an effective amount from about 5 to about 15 ppm.

DESCRIPTION OF THE PREFERRED EMBODIMENTS

The present invention provides a method for modifying the Bayer process. In the Bayer process, alumina trihydrate crystals are produced by crystallization of alumina trihydrate from a hot caustic Bayer process liquor. Sodium hydroxide solubilizes aluminum value of the ore as sodium aluminate. Plants typically operate in a total alkalinity range of 200 to 330 g/l as $Na_2CO_3$. If the alkalinity can be increased by adding sodium hydroxide, more aluminum values can be dissolved resulting in increased production of alumina trihydrate precipitate. A major limiting factor to higher alkalinity is the co-precipitation of sodium oxalate, which for example causes the alumina trihydrate to precipitate as a very fine material which is below the usual quality specification of 90 to 95%+44 microns.

Stabilization of sodium oxalate in the Bayer liquor will allow an increase of sodium hydroxide concentration without the co-precipitation of sodium oxalate. Additional aluminum values can be recovered from Bayer process liquor by lowering precipitation temperatures. Stabilization of sodium oxalate in the Bayer liquor will allow the decrease in precipitation temperature without co-precipitation of sodium oxalate. The present invention stabilizes dissolved sodium oxalate and prevents it from co-precipitating with alumina trihydrate. This, in turn, increases the efficiency of the entire process since more caustic and/or lower precipitation temperatures can be used without the expected contamination by sodium oxalate crystals. Additionally, co-precipitation of sodium oxalate can lead to inefficiencies in the classification of alumina trihydrate. The present invention stabilizes dissolved sodium oxalate leading to improved classification of alumina trihydrate.

According to the method, an effective amount of a composition consisting essentially of a surface active alkylammonium salt compound is added to the Bayer process liquor. The alkylammonium compound is preferably a straight chain or branched compound and includes at least one quaternary amine group and at least five carbon atoms. The substituents of the quaternary amine group include, but are not limited to, the group consisting essentially of hydrogen, alkyl, alkenyl, phenyl and substituted phenyl, benzyl and substituted benzyl, or hydroxyalkyl substituent groups. Phenyl and benzyl substituent groups are selected from the group consisting essentially of alkyl, chloro, bromo, fluoro, hydroxyl, alkoxy, carboxyl and sulfonyl. The counterion includes, but is not limited to, the group consisting of chloride, bromide, hydroxide, bicarbonate, carbonate, bisulfate, sulfate and phosphate. More preferably, the alkylammonium compound includes at least twelve carbon atoms. A preferred alkylammonium compound is methyl bis(2-hydroxyethyl) oleylammonium chloride.

The alkylammonium compound of the invention is added to the Bayer process liquor, and intimately mixed with the liquor, in an amount of from about 5 to about 1,000 parts per million. More preferably, the alkylammonium compound of the invention is added in an amount of from about 5 to about 25 parts per million. Most preferably, the alkylammonium compound of the invention is added in an amount of from about 5 to about 15 parts per million. The alkylammonium compound is added after red mud separation, immediately prior to crystallization of the alumina trihydrate, or at any stage during crystallization of the alumina trihydrate, or at any stage during classification of the alumina trihydrate. The alkylammonium compound of the invention can be added neat or as a solution in an appropriate solvent. Suitable solvents include, but are not limited to, water, alcohols, caustic water and Bayer process liquor. According to one embodiment of the invention, however, the alkylammonium compound is added as a solid wax which melts and disperses in the hot Bayer process liquors. The alkylammonium compounds of the invention are thermally inactivated when the treated liquor is recycled to a digestion step where the liquor is heated to a temperature of at least about 130° centigrade.

In all the Examples below, the Bayer process liquor (charge) employed for sodium oxalate stability during alumina trihydrate precipitation is the hot caustic solution obtained after elimination of the red mud in the Bayer process. It is not necessary to an understanding of this invention to outline the whole Bayer process to those having skill in that art. The liquor, after red mud separation, is a hot, caustic filtrate, the commercial production liquor containing the aluminum values as dissolved sodium aluminate. This liquor is charged into a suitable precipitating tank or a series of connecting tanks. Here, the charge is cooled under agitation to stress the contents, causing precipitation of alumina trihydrate crystals. It is at this point in the process where the precipitation of sodium oxalate presents a problem to process operators.

The following Example is presented to describe preferred embodiments and utilities of the invention and are not meant to limit the invention unless otherwise stated in the claims appended hereto.

EXAMPLE 1

Bayer process liquor containing dissolved aluminum values was obtained after the elimination of the red mud in the Bayer process. In Example 1, the liquors were obtained from actual operating alumina manufacturing facilities. Example 1 verifies that the method of the present invention achieves the following surprising and unexpected beneficial results of inhibiting the precipitation of sodium oxalate. The above beneficial results will reduce the cost of operating a Bayer process and may enable the process operator to produce higher quality alumina trihydrate crystals. All of these effects will increase production, while decreasing cost.

Addition of the alkylammonium salt surfactants methyl bis(2-hydroxyethyl) cocoammonium chloride, methyl (15 moles ethoxylation) cocoammonium chloride, and methyl bis(2-hydroxyethyl) oleylammonium chloride obtained from Akzo Chemicals Inc., to a Bayer liquor significantly enhanced liquor sodium oxalate stability and inhibited the precipitation of sodium oxalate. The stabilizing effects of the alkylammonium compounds of the invention were compared to a sodium polyacrylate commercially available from Nalco Chemical Company, which has been commercially used to increase liquor oxalate stability. The data obtained from three different refineries demonstrates that the alkylammonium compounds of the invention significantly increase the concentration level at which sodium oxalate will precipitate from Bayer process liquors. Specifically, the compounds of the invention increased the concentration at which sodium oxalate will precipitate to about four g/l or greater, while the sodium polyacrylate treatment increased sodium oxalate breakout only up to 3.6 g/l.

The data summarized in Table 1 below demonstrates that the sodium oxalate is stabilized at low doses by the compounds of the invention in three different Bayer liquors. The addition of a Bayer process sodium oxalate stabilizer will allow refinery operators to operate at higher caustic levels and/or lower precipitator temperatures without premature precipitation of sodium oxalate, thereby improving yields.

TABLE 1

| Liquor Source | Treatment | Dose (ppm) | Oxalate Breakpoint |
|---|---|---|---|
| Plant A | Control | — | 3.3 |
| | A | 25 | >4.2 |
| | B | 25 | 4.1 |
| | C | 25 | >4.2 |
| | D | 25 | 3.6 |
| Plant A | Control | — | 3.4 |
| | A | 5 | 3.8 |
| | C | 5 | 4.0 |
| Plant B | Control | — | 3.7 |
| | A | 5 | 4.1 |
| | C | 5 | 4.2 |
| Plant C | Control | — | 3.7 |
| | A | 5 | 4.1 |
| | C | 5 | 3.9 |

A - Methyl bis(2-hydroxyethyl) cocoammonium chloride
B - Methyl (15 moles ethoxylation) cocoammonium chloride
C - Methyl bis(2-hydroxyethyl) oleylammonium chloride
D - Sodium polyacrylate

We claim:

1. A method for inhibiting the precipitation of sodium oxalate crystals in a Bayer process liquor, the method comprising the steps of adding to the Bayer liquor, after red mud separation and immediately prior to crystallization of alumina trihydrate, or during crystallization of alumina trihydrate, an effective amount from about 5 to 1000 parts per million of a composition consisting essentially of a surface active, cationic alkylammonium salt compound, said alkylammonium salt compound including at least one quaternary ammonium moiety and at least five carbon atoms, wherein the addition of the effective amount of the alkylammonium salt compound to the Bayer process liquid inhibits precipitation of sodium oxalate from the Bayer process liquor.

2. The method of claim 1 wherein the alkylammonium salt compound is selected from the group consisting of methyl bis(2-hydroxyethyl) cocoammonium chloride, methyl (15 moles ethoxylation) cocoammonium chloride, and methyl bis(2-hydroxyethyl) oleylammonium chloride.

3. The method of claim 1 wherein the alkylammonium salt compound is added in an effective amount of from about 5 to about 25 ppm.

4. The method of claim 1 wherein said alkylammonium salt compound is inactivated when the Bayer process liquor is recycled through the Bayer digester where it is heated to at least about 130° C. during the digestion.

* * * * *